(12) United States Patent
Kim et al.

(10) Patent No.: US 8,133,962 B2
(45) Date of Patent: Mar. 13, 2012

(54) INK COMPOSITION FOR COLOR FILTER AND COLOR FILTER

(75) Inventors: Dae Hyun Kim, Yuseong-gu (KR); Han Soo Kim, Yuseong-gu (KR); Mi Ae Kim, Yuseong-gu (KR); Dong Myung Shin, Yuseong-gu (KR); Jae Joon Kim, Yuseong-gu (KR); Jin Woo Cho, Yuseong-gu (KR); Ji Su Kim, Seo-gu (KR); Mi Kyoung Kim, Seo-gu (KR); Min A. Yu, Seo-gu (KR); Min Young Lim, Jungwon-gu (KR); Sung Hyun Kim, Yuseong-gu (KR)

(73) Assignee: LG Chem, Ltd., Seoul (KR)

( * ) Notice: Subject to any disclaimer, the term of this patent is extended or adjusted under 35 U.S.C. 154(b) by 74 days.

(21) Appl. No.: 12/448,847

(22) PCT Filed: Aug. 26, 2008

(86) PCT No.: PCT/KR2008/004993
§ 371 (c)(1),
(2), (4) Date: Oct. 8, 2009

(87) PCT Pub. No.: WO2009/045000
PCT Pub. Date: Apr. 9, 2009

(65) Prior Publication Data
US 2010/0179294 A1    Jul. 15, 2010

(30) Foreign Application Priority Data

Oct. 4, 2007    (KR) .................. 10-2007-0099638

(51) Int. Cl.
*C08F 12/30* (2006.01)
*C08F 20/06* (2006.01)
*C08F 22/02* (2006.01)
*C08F 20/04* (2006.01)
*C08F 2/00* (2006.01)
*C08F 4/28* (2006.01)
*C08G 18/63* (2006.01)

(52) U.S. Cl. .................. 526/287; 526/310; 526/317.1; 526/318.2; 526/318.3; 526/222; 526/210; 526/227; 524/700

(58) Field of Classification Search .................. 526/287, 526/310, 317.1, 318.2, 318.3, 222, 210, 227; 524/700
See application file for complete search history.

(56) References Cited

U.S. PATENT DOCUMENTS

| | | |
|---|---|---|
| 4,087,479 A | 5/1978 | Toyota et al. |
| 2005/0131184 A1* | 6/2005 | Yamagishi et al. ........... 526/319 |
| 2007/0141507 A1 | 6/2007 | Sakata et al. |

FOREIGN PATENT DOCUMENTS

| | | |
|---|---|---|
| JP | 05-070723 A | 3/1993 |
| KR | 10-2003-0008212 A | 1/2003 |
| KR | 10-2007-0054897 A | 5/2007 |

\* cited by examiner

*Primary Examiner* — William Cheung
(74) *Attorney, Agent, or Firm* — McKenna Long & Aldridge LLP

(57) ABSTRACT

A heat-curable ink composition and a color filter produced using the ink composition are provided. The ink composition and the color filter are highly resistant to heat and chemicals due to the use of a polyester resin prepared by polycondensation. In addition, unreacted anhydride groups are removed using a monohydric alcohol in the preparation of the ink composition to make the ink composition and the color filter very stable during storage.

14 Claims, No Drawings

INK COMPOSITION FOR COLOR FILTER AND COLOR FILTER

This application claims the benefit of PCT/KR2008/005843 filed on Oct. 6, 2008, and Korean Patent Application No. 10-2007-0108043 filed on Oct. 26, 2007, both of which are hereby incorporated herein by reference for all purposes in their entirety.

TECHNICAL FIELD

The present invention relates to an ink composition with excellent heat resistance, storage stability and chemical resistance, and a color filter produced using the ink composition.

BACKGROUND ART

Fine patterns used in the fabrication of semiconductor circuit devices and display devices, such as LCDs and PDPs, are formed by photolithography using photoresists. Photolithography has an advantage in that desired patterns can be precisely obtained, but is disadvantageous in that a number of processing steps are involved, many kinds of materials are used to maximize the effects of photoresists and large amounts of photoresists are consumed during processing (e.g., coating).

In an effort to overcome these disadvantages of photolithography, patterning for the formation of fine patterns by roll printing or inkjet printing has been proposed as a next-generation technique.

Photoresists for use in photolithography can be largely divided into positive and negative types. Of these, negative-type photoresists are photopolymerizable photosensitive resin compositions and are currently used in various applications, including photosensitizers for the formation of black matrix (BM), red, blue and green patterns, which are constituent elements of color filters for display devices, overcoat photosensitizers, column spacers, insulating materials with light-shielding properties, etc.

Heat-curable resin compositions as well as negative-type photopolymerizable photosensitive resin compositions for use in photolithography may also be used as ink compositions for use in roll printing or inkjet printing.

However, the use of photopolymerizable photosensitive resin compositions in roll printing or inkjet printing necessitates additional exposure systems other than printing equipment, which disadvantageously incurs considerable costs in the purchase and operation of the systems and requires additional processing time for exposure. Under these circumstances, techniques associated with the use of heat-curable resin compositions in roll printing or inkjet printing are used in preference to techniques associated with the use of photopolymerizable photosensitive resin compositions.

General heat-curable resins that can be used for the formation of coating films are melamine-formaldehyde, polyester, polyurethane, epoxy, phenolic, acrylic, alkyd resins, and mixtures and copolymers thereof.

A heat-curable resin used in a color ink composition for the formation of a BM, red, green or blue pattern must be highly resistant to heat and stable during storage in a mixture with a pigment and a dispersant. In view of the above requirements, an acrylic resin is the most suitable heat-curable resin.

A typical acrylic resin is prepared by random copolymerization of corresponding monomers in a mixed state in the presence of a thermal polymerization initiator. In recent years, an attempt has been made to crosslink an acrylic resin having acid groups with an ethylenically unsaturated compound in order to introduce polymerizable functional groups into side chains of the acrylic resin.

However, since the polymerizable functional groups are introduced into the acid groups of the acrylic resin, an increase in the proportion of the polymerizable functional groups in the acrylic resin implies a relatively low proportion of the acid groups left. Therefore, in the case where the acrylic resin is utilized as a negative-type photosensitive resin, the proportion of the alkali-soluble component is lowered, resulting in poor developability. Furthermore, since the acrylic resin is prepared by random free-radical polymerization of monomer having an acid group in the presence of a thermal polymerization initiator, the monomer molecules are randomly distributed in the resin to allow ethylenically unsaturated groups, which are introduced into the resin through the reaction of the ethylenically unsaturated compound and the acid groups, to be randomly distributed in the resin, leading to poor resistance of the resin to heat and chemicals.

Thus, there is an urgent need for an ink composition with excellent heat resistance, storage stability and chemical resistance.

DISCLOSURE OF INVENTION

Technical Problem

An object of the present invention is to provide an ink composition that is easy to store, is storable for a long period of time, and has improved resistance to heat and chemical resistance.

Another object of the present invention is to provide a color filter produced using the ink composition.

Technical Solution

In accordance with an aspect of the present invention, there is provided a heat-curable ink composition comprising a polyester resin, a pigment, a polyfunctional monomer, a thermal polymerization initiator and a solvent wherein the polyester resin has the structure of Formula 1:

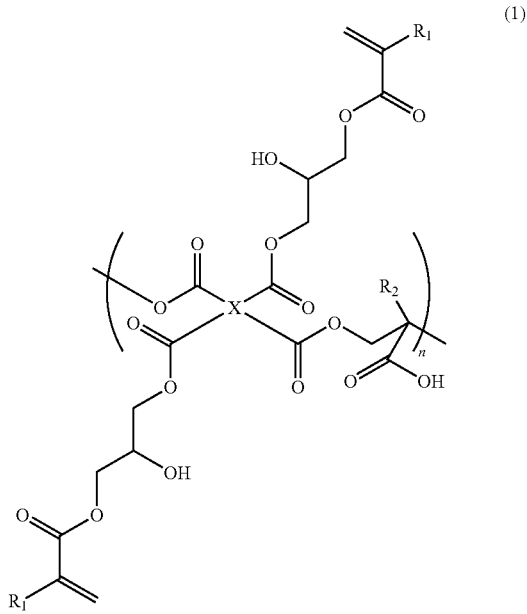

wherein X is a tetravalent group derived from a polybasic acid anhydride, each $R_1$ is a hydrogen atom or a methyl group, and $R_2$ is selected from methyl and ethyl groups.

The polyester resin of Formula 1 may preferably be derived from a compound prepared by ring-opening polymerization of a) a diol compound having an acid group and b) a polybasic acid anhydride.

The diol compound a) may preferably have the structure of Formula 2:

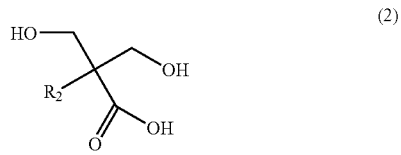

wherein $R_2$ is selected from methyl and ethyl groups.

The polybasic acid anhydride b) may preferably be a compound selected from the group consisting of 1,2,4,5-benzenetetracarboxylic dianhydride, 3,3',4,4'-benzophenonetetracarboxylic dianhydride, biphenyltetracarboxylic dianhydride, bis(3,4-dicarboxyphenyl)ether dianhydride, bis(3,4-dicarboxyphenyl)sulfide dianhydride, bis(3,4-dicarboxyphenyl) sulfone dianhydride, 1,4-bis(2,3-dicarboxyphenoxy)benzene dianhydride, 1,3-bis(3,4-dicarboxyphenoxy)benzene dianhydride, 2,3,6,7-naphthalenetetracarboxylic dianhydride, 4,4'-bis(3,4-dicarboxyphenoxy)diphenyl dianhydride, 4,4'-bis(3,4-dicarboxyphenoxy)diphenyl ether dianhydride, 4,4'-bis(3,4-dicarboxyphenoxy)diphenyl sulfone dianhydride, bis(3,4-dicarboxyphenyl)methane dianhydride, 1,1-bis(3,4-dicarboxyphenyl)ethane dianhydride, 1,2-bis(3,4-dicarboxyphenyl)ethane dianhydride, 2,2-bis(3,4-dicarboxyphenyl)propane dianhydride, 2,2-bis[4-(3,4-dicarboxyphenoxy)phenyl]propane dianhydride, 4-(2,3-dicarboxyphenoxy)-4'-(3,4-dicarboxyphenoxy)diphenyl-2,2-propane dianhydride, ethylene glycol ditrimellitate, 2,2-bis(3,4-dicarboxyphenyl)hexafluoropropane dianhydride, 1,3-bis(3,4-dicarboxyphenyl)hexafluoropropane dianhydride, 2,2-bis[4-(3,4-dicarboxyphenoxy)phenyl]hexafluoropropane dianhydride and 4,4'-bis[2-(3,4-dicarboxyphenyl)hexafluoroisopropyl]diphenyl ether. These polybasic acid anhydrides may be used alone or as a mixture of two or more thereof.

Preferably, the heat-curable ink composition of the present invention may comprise 1 to 30% by weight of the polyester resin, 2 to 15% by weight of the pigment, 0.1 to 5% by weight of the thermal polymerization initiator, 1 to 30% by weight of the polyfunctional monomer, and 50 to 90% by weight of the solvent, based on the total weight of the ink composition.

The thermal polymerization initiator may preferably be selected from the group consisting of azo compounds, azonitrile compounds, azoamide compounds, azoamidine compounds, and macroazo compounds. These thermal polymerization initiators may be used alone or as a mixture of two or more thereof.

The polyfunctional monomer may preferably be selected from the group consisting of polyethylene glycol mono(meth)acrylate, polypropylene glycol mono(meth)acrylate, phenoxyethyl (meth)acrylate, polyethylene glycol (meth)acrylate, polypropylene glycol (meth)acrylate, trimethylolethane triacrylate, trimethylolpropane triacrylate, neopentyl glycol (meth)acrylate, pentaerythritol tetraacrylate, pentaerythritol triacrylate, dipentaerythritol pentaacrylate, dipentaerythritol hexaacrylate, caprolactone-modified polyfunctional monomers, epoxy acrylates of bisphenol A derivatives, novolac-epoxy acrylates, and urethane-based polyfunctional monomers. These polyfunctional monomers may be used alone or as a mixture of two or more thereof.

The heat-curable ink composition of the present invention may further comprise a surfactant.

The surfactant may preferably be selected from silicone- and fluorine-based surfactants.

The surfactant may preferably be present in an amount of 0.03 to 1% by weight, based on the total weight of the heat-curable ink composition.

The heat-curable ink composition of the present invention may further comprise an acrylic resin as a binder resin such that the polyester resin of Formula 1 is present in an amount of at least 30% by weight with respect to the total weight of all binder resins.

The heat-curable ink composition of the present invention may further comprise at least one additive selected from dispersants, curing accelerators, thermal polymerization inhibitors, plasticizers, adhesion promoters and fillers.

The additive may preferably be added in an amount of 0.01 to 2% by weight, based on the total weight of the heat-curable ink composition.

In accordance with another aspect of the present invention, there is provided a color filter produced using the heat-curable ink composition.

Advantageous Effects

The ink composition and the color filter of the present invention are highly resistant to heat and chemicals and are very stable during storage.

BEST MODE FOR CARRYING OUT THE INVENTION

The present invention provides an ink composition comprising a polyester resin of Formula 1:

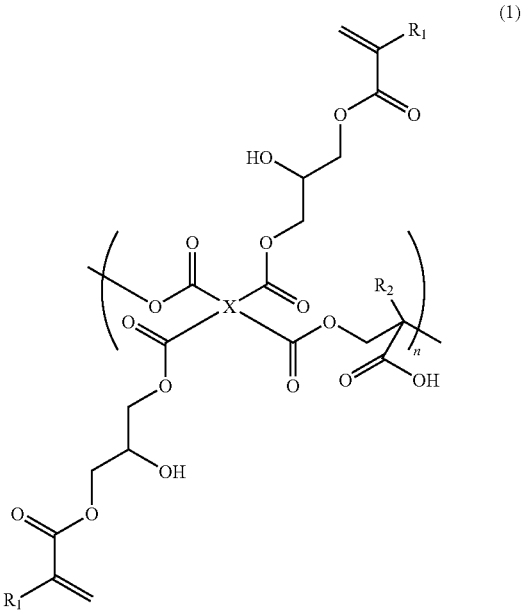

wherein X is a tetravalent group derived from a polybasic acid anhydride, each $R_1$ is a hydrogen atom or a methyl group, and $R_2$ is selected from methyl and ethyl groups.

In the present invention, the polyester resin prepared by polycondensation is used rather than an acrylic resin prepared by random free-radical copolymerization.

Specifically, a) a diol compound having an acid group is polycondensed with b) a polybasic acid anhydride to obtain a polyester resin, and then the polyester resin is reacted with c) a compound having at least one ethylenically unsaturated group and at least one epoxy group in the molecule to prepare the final polyester resin (Formula 1) having ethylenically unsaturated groups.

Particularly, anhydride groups remaining at the terminals of the polycondensation product are reacted with d) a monohydric alcohol component to be converted to ester and carboxyl groups by ring opening. The removal of the anhydride groups makes the ink composition very stable during storage, easy to store and, storable for a long period of time.

The acid groups are regularly distributed to allow the ethylenically unsaturated groups to be regularly introduced and distributed in the polyester resin prepared by alternating reaction of the diol compound (a) and the polybasic acid anhydride (b), unlike in an acrylic resin prepared by random free-radical copolymerization. Therefore, in comparison with an acrylic resin as a random copolymer, the crosslinking of the polyester resin by curing is further improved, leading to excellent heat resistance and chemical resistance of the ink composition.

The diol compound a) is represented by Formula 2:

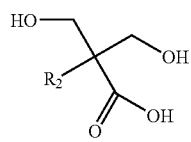

(2)

wherein $R_2$ is a methyl or ethyl group.

The polybasic acid anhydride b) is a compound that has two acid anhydride groups capable of alternating copolymerization with the diol compound a) in one molecule. Specific examples of the polybasic acid anhydride b) include 1,2,4,5-benzenetetracarboxylic dianhydride, 3,3',4,4'-benzophenonetetracarboxylic dianhydride, biphenyltetracarboxylic dianhydride, bis(3,4-dicarboxyphenyl)ether dianhydride, bis(3,4-dicarboxyphenyl)sulfide dianhydride, bis(3,4-dicarboxyphenyl)sulfone dianhydride, 1,4-bis(2,3-dicarboxyphenoxy)benzene dianhydride, 1,3-bis(3,4-dicarboxyphenoxy)benzene dianhydride, 2,3,6,7-naphthalenetetracarboxylic dianhydride, 4,4'-bis(3,4-dicarboxyphenoxy)diphenyl dianhydride, 4,4'-bis(3,4-dicarboxyphenoxy)diphenyl ether dianhydride, 4,4'-bis(3,4-dicarboxyphenoxy)diphenyl sulfone dianhydride, bis(3,4-dicarboxyphenyl)methane dianhydride, 1,1-bis(3,4-dicarboxyphenyl)ethane dianhydride, 1,2-bis(3,4-dicarboxyphenyl)ethane dianhydride, 2,2-bis(3,4-dicarboxyphenyl)propane dianhydride, 2,2-bis[4-(3,4-dicarboxyphenoxy)phenyl]propane dianhydride, 4-(2,3-dicarboxyphenoxy)-4'-(3,4-dicarboxyphenoxy)diphenyl-2,2-propane dianhydride, ethylene glycol ditrimellitate, 2,2-bis(3,4-dicarboxyphenyl)hexafluoropropane dianhydride, 1,3-bis(3,4-dicarboxyphenyl)hexafluoropropane dianhydride, 2,2-bis[4-(3,4-dicarboxyphenoxy)phenyl]hexafluoropropane dianhydride and 4,4'-bis[2-(3,4-dicarboxyphenyl)hexafluoroisopropyl]diphenyl ether. These polybasic acid anhydrides may be used alone or as a mixture of two or more thereof.

The resin prepared from the diol compound a) and the polybasic acid anhydride b) can be represented by Formula 3:

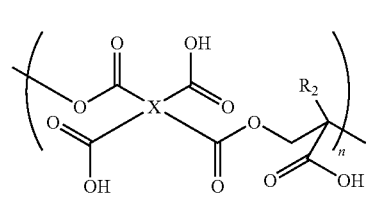

(3)

wherein X is as defined in Formula 1, and $R_2$ is a methyl or ethyl group.

The resin of Formula 3 prepared by polycondensation of the diol compound a) and the polybasic acid anhydride b) is additionally reacted with the compound c) to introduce polymerizable reactive groups thereinto. Specifically, the acid groups of the resin (Formula 3) are reacted with the epoxy group of the compound c) to introduce polymerizable reactive groups into side chains of the resin of Formula 3. Polymerizable reactive groups are randomly introduced into side chains of a typical negative-type acrylic photosensitive resin or heat-curable acrylic resin for use in photolithography. In contrast, polymerizable reactive groups can be introduced in every repeating unit of the polyester resin (Formula 1) used in the ink composition of the present invention. Due to the regular distribution of the polymerizable reactive groups, the polyester resin can be cured to form a uniform matrix, achieving improved heat resistance and chemical resistance of the ink composition.

The monohydric alcohol d) is a compound that converts unreacted anhydride groups of the component b) remaining in a solution after polycondensation of the components a) and b) or anhydride groups remaining at the terminals of the polyester resin (Formula 3) to ester and carboxyl groups by ring opening. That is, the monohydric alcohol d) functions to remove the highly reactive anhydride groups to enhance the storage stability of the ink composition.

Any compound having an alcohol group may be used as the monohydric alcohol d). An alcohol compound having at least one polymerizable unsaturated group is more preferred in terms of degree of cure.

Specific examples of the monohydric alcohol d) include: alkyl alcohols, such as butanol and isopropanol; and hydroxyl group-containing acrylate compounds, such as 2-hydroxyethyl (meth)acrylate, 3-hydroxypropyl(meth)acrylate, 1,3-(meth)acryloyl-2-hydroxypropane, pentaerythritol triacrylate and dipentaerythritol pentaacrylate.

The use of the hydroxyl group-containing acrylate compound as the monohydric alcohol d) is particularly preferred in terms of photosensitivity.

The acid value of the polyester resin of Formula 1 is preferably in the range of 0 to 200 KOH mg/g.

Heat-curable ink compositions for use in roll printing or inkjet printing do not need to undergo alkali development, unlike photoresists for use in photolithography. Therefore, the polyester resin of Formula 1 is not necessarily required to have an acid value above zero. Meanwhile, if the acid value of the resin exceeds 200 KOH mg/g (i.e. the number of the ethylenically unsaturated groups decreases), the degree of cure of the resin by crosslinking drops.

The polyester resin preferably has a weight average molecular weight in the range of 1,000 to 200,000 and more preferably 3,000 to 30,000.

If the weight average molecular weight of the polyester resin is lower than 1,000, binding between the polyester resin as a binder polymer and other constituent components of the ink composition is weak and fundamental physical properties (e.g., resistance to heat and chemicals) required in a color filter pattern are unsatisfactory. Meanwhile, if the weight average molecular weight of the polyester resin exceeds 200,000, the viscosity of the polymer markedly increases, resulting in a remarkable increase in the viscosity of the final ink composition. Also, this viscosity increase leads to poor flowability, making it difficult to control coating thickness or secure uniform coating thickness.

In addition to the polyester resin as a binder resin, the heat-curable ink composition of the present invention may comprise e) a colorant (e.g., a pigment) for creating desired color characteristics, f) a polyfunctional monomer having at least one ethylenically unsaturated double bond, g) a thermal polymerization initiator, and h) a solvent.

The heat-curable ink composition of the present invention may further comprise at least one additive selected from i) a catalyst, j) a surfactant and other additives.

As the colorant e), a red pigment, a violet pigment, a yellow pigment, an orange pigment, a green pigment or the like is used.

Examples of red pigments that can be used to create desired color characteristics in the preparation of the heat-curable color ink composition include: naphthol red pigments, such as Pig.Red #1 (C.I.12070), Pig.Red #2 (C.I.12310), Pig.Red #3 (C.I.12120), Pig.Red #4 (C.I.12085), Pig.Red #5 (C.I.12490), Pig.Red #6 (C.I.12090), Pig.Red #7 (C.I.12420), Pig.Red #8 (C.I.12355), Pig.Red #9 (C.I.12460), Pig.Red #10 (C.I.12440), Pig.Red #11 (C.I.12430), Pig.Red #12 (C.I.12385), Pig.Red #13 (C.I.12395), Pig.Red #14 (C.I.12380), Pig.Red #15 (C.I.12465), Pig.Red #16 (C.I.12500), Pig.Red #17 (C.I.12390), Pig.Red #18 (C.I.12350), Pig.Red #21 (C.I.12300), Pig.Red #22 (C.I.12315), Pig.Red #23 (C.I.12355), Pig.Red #31 (C.I.12360), Pig.Red #32 (C.I.12320), Pig.Red #95 (C.I.15897), Pig.Red #112 (C.I.12370), Pig.Red #114 (C.I.12351), Pig.Red #119 (C.I.12469), Pig.Red #146 (C.I.12485), Pig.Red #147 (C.I.12433), Pig.Red #148 (C.I.12369), Pig.Red #150 (C.I.12290), Pig.Red #151 (C.I.15890), Pig.Red #184 (C.I.12487), Pig.Red #187 (C.I.12486), Pig.Red #188 (C.I.12467), Pig.Red #210 (C.I.12474), Pig.Red #245 (C.I.12317), Pig.Red #253 (C.I.12375), Pig.Red #258 (C.I.12318) and Pig.Red #261 (C.I.12468); naphthol metal complexes, such as Pig.Red #49 (C.I.15630), Pig.Red #49:1 (C.I.15630:1), Pig.Red #49:2 (C.I.15630:2), Pig.Red #49:3 (C.I.15630:3), Pig.Red #50:1 (C.I.15500:1), Pig.Red #51:1 (C.I.15580:1), Pig.Red #53 (C.I.15585), Pig.Red #53:1 (C.I.15585:1), Pig.Red #68 (C.I.15525), Pig.Red #243 (C.I.15910) and Pig.Red #247 (C.I.15915); disazopyrazolone pigments, such as Pig.Red #37 (C.I.21205), Pig.Red #38 (C.I.21210) and Pig.Red #41 (C.I.21200); disazo condensation pigments, such as Pig.Red #144 (C.I.20735), Pig.Red #166 (C.I.20035), Pig.Red #220 (C.I.20055), Pig.Red #221 (C.I.20065) and Pig.Red #242 (C.I.20067); 2-hydroxy-3-naphthoic acid metal complexes, such as Pig.Red #48:1 (C.I.15865:1), Pig.Red #48:2 (C.I.15865:2), Pig.Red #48:3 (C.I.15865:3), Pig.Red #48:4 (C.I.15865:4), Pig.Red #48:5 (C.I.15865:5), Pig.Red #52:1 (C.I.15860:1), Pig.Red #52:2 (C.I.15860:2), Pig.Red #57:1 (C.I.15850:1), Pig.Red #58:2 (C.I.15825:2), Pig.Red #58:4 (C.I.15825:4), Pig.Red #63:1 (C.I.15880:1), Pig.Red #63:2 (C.I.15880:2), Pig.Red #64 (C.I.15800), Pig.Red #64:1 (C.I.15800:1) and Pig.Red #200 (C.I.15867); naphthalenesulfonic acid metal complexes, such as Pig.Red #60:1 (C.I.16105:1), Pig.Red #66 (C.I.18000:1) and Pig.Red #67 (C.I.18025:1); triarylcarbonium pigments, such as Pig.Red #81:1 (C.I.45160:1), Pig.Red #81:3 (C.I.45160:3) and Pig.Red #169 (C.I.45160:2); anthraquinone pigments, such as Pig.Red #89 (C.I.60745) and Pig.Red #177 (C.I.65300); thioindigo pigments, such as Pig.Red #88 (C.I.73312) and Pig.Red #181 (C.I.73360); quinacridone pigments, such as Pig.Red #122 (C.I.73915), Pig.Red #207 (C.I.73900) and Pig.Red #209 (C.I.73905); perylene pigments, such as Pig.Red #123 (C.I.71145), Pig.Red #149 (C.I.71137), Pig.Red #178 (C.I.71155), Pig.Red #179 (C.I.71130), Pig.Red #190 (C.I.71140), Pig.Red #194 (C.I.71100) and Pig.Red #224 (C.I.71127); benzimidazolone pigments, such as Pig.Red #171 (C.I.12512), Pig.Red #175 (C.I.12513), Pig.Red #176 (C.I.12515), Pig.Red #185 (C.I.12516) and Pig.Red #208 (C.I.12514); pyranthrone pigments, such as Pig.Red #216 (C.I.59710); diketopyrrolopyrrole pigments, such as Pig.Red #254 (C.I.56110); and isoindoline pigments, such as Pig.Red #260 (C.I.56295).

Examples of violet pigments suitable for use in the present invention include: triarylcarbonium pigments, such as Pig.Violet #1 (C.I.45170:2), Pig.Violet #2 (C.I.45175:1), Pig.Violet #3 (C.I.42535:2), Pig.Violet #27 (C.I.42535:3) and Pig.Violet #39 (C.I.42555:2); anthraquinone pigments, such as Pig.Violet #5:1 (C.I.58055:1); naphthol pigments, such as Pig.Violet #25 (C.I.12321) and Pig.Violet #50 (C.I.12322); quinacridone pigments, such as Pig.Violet #19 (C.I.73900); dioxazine pigments, such as Pig.Violet #23 (C.I.51319) and Pig.Violet #37 (C.I.51345); perylene pigments, such as Pig.Violet #29 (C.I.71129); and benzimidazolone pigments, such as Pig.Violet #32 (C.I.12517).

Examples of blue pigments suitable for use in the present invention include: triarylcarbonium pigments, such as Pig.Blue #1 (C.I.42595:2), Pig.Blue #2 (C.I.44045:2), Pig.Blue #9 (C.I.42025:1), Pig.Blue #10 (C.I.44040:2), Pig.Blue #14 (C.I.42600:1), Pig.Blue #18 (C.I.42770:1), Pig.Blue #19 (C.I.42750), Pig.Blue #56 (C.I.42800) and Pig.Blue #62 (C.I.44084); Cu phthalocyanine pigments, such as Pig.Blue #15 (C.I.74160), Pig.Blue #15:1 (C.I.74160), Pig.Blue #15:2 (C.I.74160), Pig.Blue #15:3 (C.I.74160), Pig.Blue #15:4 (C.I.74160) and Pig.Blue #15:6 (C.I.74160); metal-free phthalocyanine pigments, such as Pig.Blue #16 (C.I.74100); indanthrone pigments, such as Pig.Blue #60 (C.I.69800) and Pig.Blue #64 (C.I.69825); and indigo pigments, such as Pig.Blue #66 (C.I.73000) and Pig.Blue #63 (C.I.73015:x).

Examples of green pigments suitable for use in the present invention include: triarylcarbonium pigments, such as Pig.Green #1 (C.I.42040:1), Pig.Green #2 (C.I.42040:1) and Pig.Green #4 (C.I.42000:2); Cu phthalocyanine pigments, such as Pig.Green #7 (C.I.74260) and Pig.Green #36 (C.I.74265); and metal complexes, such as Pig.Green #8 (C.I.10006) and Pig.Green #10 (C.I.12775).

Examples of yellow pigments suitable for use in the present invention include: monoazo pigments, such as Pig.Yellow #1 (C.I.11680), Pig.Yellow #2 (C.I.11730), Pig.Yellow #3 (C.I.11710), Pig.Yellow #5 (C.I.11660), Pig.Yellow #6 (C.I.11670), Pig.Yellow #10 (C.I.12710), Pig.Yellow #49 (C.I.11765), Pig.Yellow #65 (C.I.11740), Pig.Yellow #73 (C.I.11738), Pig.Yellow #74 (C.I.11741), Pig.Yellow #75 (C.I.11770), Pig.Yellow #97 (C.I.11767), Pig.Yellow #98 (C.I.11727), Pig.Yellow #111 (C.I.11745), Pig.Yellow #116 (C.I.11790) and Pig.Yellow #167 (C.I.11737); monoazo metal complexes, such as Pig.Yellow #61 (C.I.13880), Pig.Yellow #62:1 (C.I.13940:1), Pig.Yellow #100 (C.I.19140:1), Pig.Yellow #168 (C.I.13960), Pig.Yellow #169 (C.I.13955) and Pig.Yellow #183 (C.I.18792); bisacetoacetarylide pigments, such as Pig.Yellow #16 (C.I.20040); diarylide pigments, such as Pig.Yellow #12 (C.I.21090), Pig.Yellow #13 (C.I.21100), Pig.Yellow #14 (C.I.21095), Pig.Yellow #17 (C.I.21105), Pig.Yellow #55 (C.I.21096), Pig.Yellow #63 (C.I.21091), Pig.Yellow #81 (C.I.21127), Pig.Yellow #83 (C.I.21108), Pig.Yellow #87 (C.I.21107:1), Pig.Yellow #113 (C.I.21126), Pig.Yellow #114 (C.I.21092), Pig.Yellow #124 (C.I.21107), Pig.Yellow #126 (C.I.21101), Pig.Yellow #127 (21102), Pig.Yellow #152 (C.I.21111), Pig.Yellow #170 (C.I.21104), Pig.Yellow #171 (C.I.21106), Pig.Yellow #172 (C.I.21109) and Pig.Yellow #174 (C.I.21098); flavanthrone pigments, such as Pig.Yellow #24 (C.I.70600); diazo condensation pigments, such as Pig.Yellow #93 (C.I.20710), Pig.Yellow #94 (C.I.20038), Pig.Yellow #95 (C.I.20034), Pig.Yellow #128 (C.I.20037) and Pig.Yellow #166 (C.I.20035); anthraquinone pigments, such as Pig.Yellow #123 (C.I.65049) and Pig.Yellow #147 (C.I.60645); aldazine pigments, such as Pig.Yellow #101 (C.I.48052); naphthalenesulfonic acid metal complexes, such as Pig.Yellow #104 (C.I.15985:1); anthrapyrimidine pigments, such as Pig.Yellow #108 (C.I.68420); isoindolinone pigments, such as Pig.Yellow #109 (C.I.56284), Pig.Yellow #110 (C.I.56280), Pig.Yellow #139 (C.I.56298) and Pig.Yellow #185 (C.I.56290); benzimidazolone pigments, such as Pig.Yellow #123 (C.I.11783), Pig.Yellow #154 (C.I.13980), Pig.Yellow #175 (C.I.11784), Pig.Yellow #180 (C.I.21290) and Pig.Yellow #181 (C.I.11777); quinophthalone pigments, such as Pig.Yellow #138 (C.I.56300); and metal complexes, such as Pig.Yellow #117 (C.I.48043), Pig.Yellow #129 (C.I.48042), Pig.Yellow #150 (C.I.12764), Pig.Yellow #153 (C.I.48545), Pig.Yellow #177 (C.I.48120) and Pig.Yellow #179 (C.I.48125).

Examples of orange pigments suitable for use in the present invention include: monoazo pigments, such as Pig.Orange #1 (C.I.11725) and Pig.Orange #6 (C.I.12730); naphthol pigments, such as Pig.Orange #2 (C.I.12060), Pig.Orange #5 (C.I.12075), Pig.Orange #22 (C.I.12470), Pig.Orange #24 (C.I.12305) and Pig.Orange #38 (C.I.12367); naphthol metal complexes, such as Pig.Orange #17 (C.I.15510:1), Pig.Orange #17:1 (C.I.15510:2) and Pig.Orange #46 (C.I.15602); disazopyrazolone pigments, such as Pig.Orange #13 (C.I.21110) and Pig.Orange #34 (C.I.21115); diarylide pigments, such as Pig.Orange #15 (C.I.21130) and Pig.Orange #16 (C.I.21160); naphthalenesulfonic acid metal complexes, such as Pig.Orange #19 (C.I.15990); disazo condensation pigments, such as Pig.Orange #31 (C.I.20050); benzimidazolone pigments, such as Pig.Orange #36 (C.I.11780) and Pig.Orange #60 (C.I.11782); pyranthrone pigments, such as Pig.Orange #40 (C.I.59700); perinone pigments, such as Pig.Orange #43 (C.I.71105); quinacridone pigments, such as Pig.Orange #48 (C.I.73900); and isoindoline pigments, such as Pig.Orange #61 (C.I.11265), Pig.Orange #66 (C.I.48210) and Pig.Orange #69 (C.I.56292). These pigments can be used as a mixture of two or more thereof to produce the desired colors.

The amount of the pigment is determined depending on the required color and desired color characteristics and film characteristics. The pigment is preferably present in an amount of 2 to 15% by weight, based on the total weight of the ink composition.

The polyester resin is preferably present in an amount of 1 to 30% by weight, based on the total weight of the heat-curable ink composition. If the polyester resin, which functions to bind the other constituent components of the ink composition, is present in an amount of less than 1% by weight, fundamental physical properties (e.g., resistance to heat and chemicals) required in a color filter pattern are unsatisfactory. Meanwhile, if the polyester resin is present in an amount of more than 30% by weight, the final composition becomes too viscous, making it difficult to maintain the uniformity of a film upon coating, and the intended color characteristics cannot be attained due to low contents of the other components (e.g., the pigment).

The polyester resin of Formula 1 is used as a single binder resin, but an acrylic resin as another binder resin may be used together with the polyester resin of Formula 1. When the two binder resins are used, the amount of the polyester resin is preferably at least 30% by weight, based on the total weight of the binder resins.

As the polyfunctional monomer f), there can be used a compound having at least one unsaturated group capable of addition polymerization in the molecule and having a boiling point of at least 100° C. or a caprolactone-modified polyfunctional monomer.

The compound having at least one unsaturated group capable of addition polymerization in the molecule and having a boiling point of at least 100° C. may be, for example: a monofunctional monomer, such as polyethylene glycol mono(meth)acrylate, polypropylene glycol mono(meth)acrylate or phenoxyethyl (meth)acrylate; or a polyfunctional monomer, such as polyethylene glycol (meth)acrylate, polypropylene glycol (meth)acrylate, trimethylolethane triacrylate, trimethylolpropane triacrylate, neopentyl glycol (meth)acrylate, pentaerythritol tetraacrylate, pentaerythritol triacrylate, dipentaerythritol pentaacrylate or dipentaerythritol hexaacrylate. The caprolactone-modified polyfunctional monomer may be, for example, KAYARAD DPCA-20, 30, 60, 120 introduced into dipentaerythritol, KAYARAD TC-110S introduced into tetrahydrofuryl acrylate, or KAYARAD HX-220 or KAYARAD HK-620 introduced into neopentyl glycol hydroxypivalate.

Other examples of polyfunctional monomers suitable for use in the present invention include epoxy acrylates of bisphenol A derivatives, novolac-epoxy acrylates, and urethane-based polyfunctional acrylates, such as U-324A, U15HA and U-4HA. These polyfunctional monomers may be used alone or as a mixture of two or more thereof.

The polyfunctional monomer f) is preferably used in an amount of 1 to 30% by weight, based on the total weight of the heat-curable ink composition (5 to 50% by weight, based on the total solids content of the heat-curable ink composition). The use of the polyfunctional monomer f) in an amount of less than 1% by weight deteriorates the strength of a final coating film. Meanwhile, the use of the polyfunctional monomer f) in an amount exceeding 30% by weight causes an excessive increase in the tackiness of a heat-curable ink resin layer, and as a result, the strength of a final film is insufficient and impurities are likely to be attached to the film.

The thermal polymerization initiator g) is an azo compound, and non-limiting examples thereof include: azonitrile compounds, such as V-60, V-65, V-59, V-70 and V-40; azo ester compounds, such as V-601; azoamide compounds, VA-086, VA-085, VA-080, Vam-110, Vam-111 and VF-096; azoamidine compounds, such as V-50, VA-044, VA-046B, Aam-027, VA-060, VA-057 and VA-061; and macroazo initiators, such as VPS-0501, VPS-1001, VPE-0201, VPE-0401, VPE-0601 and VPTG-0301, all of which are commercially available from Wako Pure Chemical Industries Ltd.

The thermal polymerization initiator g) is preferably present in an amount of 0.1 to 5.0% by weight, based on the total weight of the heat-curable ink composition. The use of the thermal polymerization initiator g) in an amount of less than 0.1% by weight leads to insufficient thermal polymerization, resulting in poor physical properties of a final ink film. Meanwhile, the use of the thermal polymerization initiator g) in an amount of more than 5.0% by weight causes a decrease in the solubility of the ink composition, and as a result, precipitation occurs or thermal degradation of the thermal polymerization initiator takes places during heat curing, which may cause contamination by the thermal degradation products.

As the surfactant j), a silicone- or fluorine-based surfactant can be used. Specific examples of the silicone-based surfactant include, but are not limited to: products commercially available from BYK-Chemie under the trademarks BYK-077, BYK-085, BYK-300, BYK-301, BYK-302, BYK-306, BYK-307, BYK-310, BYK-320, BYK-322, BYK-323, BYK-325, BYK-330, BYK-331, BYK-333, BYK-335, BYK-341v344, BYK-345v346, BYK-348, BYK-354, BYK-355, BYK-356, BYK-358, BYK-361, BYK-370, BYK-371, BYK-375, BYK-380 and BYK-390. Specific examples of the fluorine-based surfactant include, but are not limited to: products commercially available from DaiNippon Ink & Chemicals (DIC) under the trademarks F-114, F-177. F-410, F-411, F-450, F-493, F-494, F-443, F-444, F-445, F-446, F-470, F-471, F-472SF, F-474, F-475, F-477, F-478, F-479, F-480SF, F-482, F-483, F-484, F-486, F-487, F-172D, MCF-350SF, TF-1025SF, TF-1117SF, TF-1026SF, TF-1128, TF-1127, TF-1129, TF-1126, TF-1130, TF-1116SF, TF-1131, TF1132, TF1027SF, TF-1441 and TF-1442.

The surfactant j) is preferably used in an amount of 0.03 to 1.0% by weight, based on the total weight of the heat-curable ink composition. The use of the surfactant j) in an amount of less than 0.03% by weight causes poor leveling or wetting properties upon ink coating to impede smooth coating of the ink composition. Meanwhile, the use of the surfactant j) in an excessively large amount of more than 1.0% by weight may cause the problem of poor defoaming properties.

The kind of the solvent h) is determined taking into consideration various factors, such as solubility, pigment dispersibility and coatability. Examples of solvents suitable for use in the present invention include propylene glycol monomethyl ether, ethylene glycol monomethyl ether acetate, propylene glycol monomethyl ether acetate, propylene glycol monoethyl ether acetate, diethylene glycol dimethyl ether, cyclohexanone, 2-heptanone, 3-heptanone, 2-hydroxyethyl propionate, 3-methyl-3-methoxybutyl propionate, ethyl-3-methoxy propionate, methyl-3-ethoxy propionate, ethyl-3-ethoxy propionate, butyl acetate, amyl formate, isoamyl acetate, isobutyl acetate, butyl propionate, isopropyl butyrate, ethyl butyrate, butyl butyrate, ethyl pyruvate, butyrolactone, methyl ethyl ketone, methyl cellosolve, ethyl cellosolve, ethylene glycol dimethyl ether, ethylene glycol diethyl ether, propylene glycol dimethyl ether, propylene glycol diethyl ether, diethylene glycol diethyl ether, diethylene glycol methyl ethyl ether, 2-ethoxypropanol, 2-methoxypropanol, 3-methoxybutanol, cyclohexanone, cyclopentanone, 3-methoxybutyl acetate, ethyl 3-ethoxypropionate, ethyl cellosolve acetate, methyl cellosolve acetate, butyl acetate, ethyl acetate, propyl acetate, and dipropylene glycol monomethyl ether. These solvents may be used alone or as a mixture of two or more thereof.

The solvent h) is preferably present in an amount of 50 to 90% by weight, based on the total weight of the heat-curable ink composition.

If needed, the heat-curable ink composition may further comprise at least one additive selected from dispersants, curing accelerators, thermal polymerization inhibitors, plasticizers, adhesion promoters and fillers. The additive is preferably present in an amount of 0.01 to 2% by weight, based on the total weight of the heat-curable ink composition.

MODE FOR THE INVENTION

Hereinafter, the present invention will be explained in more detail with reference to the following examples. However, these examples are given for the purpose of illustration and are not intended to limit the scope of the invention.

Examples 1-6

Preparation of Heat-Curable Ink Compositions Comprising Polyester Resin

Example 1

The following components were mixed together with stirring for 5 hours to prepare a heat-curable blue ink composition for use in roll printing. The contents of the components are expressed as a percent based on the total weight of the components.

Colorants: 3.76% by weight of a blue pigment (Pig. Blue #15:6) and 0.94% by weight of a violet pigment (Pig. Violet #23)

Binder resins

Acrylic resin: 1.54% by weight of a polymer (Mw=9,000, A.V. 90) prepared by addition polymerization of a benzyl (meth)acrylate/(meth)acrylic acid (70:30 (mol/mol)) copolymer with allyl glycidyl ether Polyester resin: 4.7% by weight of a polymer (Mw=12, 400, A.V. 99) prepared by addition polymerization of a polycondensation product of ethylene glycol ditrimellitate/2,2-bis(hydroxymethyl)propionic acid (70:100 (mol/mol)) with glycidyl methacrylate and hydroxyethyl methacrylate (140:7 (mol/mol))

Polyfunctional monomer: 9.4% by weight of dipentaerythritol hexaacrylate

Thermal polymerization initiator: 0.5% by weight of an azoamide (V-40, Wako Pure Chemical Industries Ltd.)

Additives: 1.616% by weight of a polyester dispersant, 0.1% by weight of 3-methacryloxypropyltrimethoxysilane as an adhesion promoter, 0.1% by weight of a first surfactant (F-475, DaiNippon Ink & Chemicals) and 0.2% by weight of a second surfactant (F-487, DaiNippon Ink & Chemicals)

Solvents: 37.014% by weight of propylene glycol monomethyl ether acetate, 32.169% by weight of methyl ethyl ketone, and 7.961% by weight of 2-ethoxypropanol Example 2

A blue ink composition for use in roll printing was prepared in the same manner as in Example 1 except that 6.24% by weight of the polyester resin was used singly as a binder resin without using the acrylic resin.

Example 3

The following components were mixed together with stirring for 5 hours to prepare a heat-curable red ink composition for use in roll printing. The contents of the components are expressed as a percent based on the total weight of the components.

Colorants: 3.76% by weight of a red pigment (Pig. Red #254), 1.731% by weight of a red pigment (Pig. Red #177) and 1.212% by weight of a yellow pigment (Pig. Yellow #150)

Binder resins
Acrylic resin: 1.446% by weight of a polymer (Mw=9,000, A.V. 90) prepared by addition polymerization of a benzyl (meth)acrylate/(meth)acrylic acid (70:30 (mol/mol)) copolymer with allyl glycidyl ether
Polyester resin: 2.731% by weight of a polymer (Mw=12,400, A.V. 99) prepared by addition polymerization of a polycondensation product of ethylene glycol ditrimellitate/2,2-bis(hydroxymethyl)propionic acid (70:100 (mol/mol)) with glycidyl methacrylate and hydroxyethyl methacrylate (140:7 (mol/mol))
Polyfunctional monomer: 3.337% by weight of dipentaerythritol hexaacrylate
Thermal polymerization initiator: 0.7% by weight of an azoamide (V-40, Wako Pure Chemical Industries Ltd.)
Additives: 2.692% by weight of a polyester dispersant, 0.146% by weight of 3-methacryloxypropyltrimethoxysilane as an adhesion promoter, 0.15% by weight of a first surfactant (F-475, DaiNippon Ink & Chemicals) and 0.15% by weight of a second surfactant (F-487, DaiNippon Ink & Chemicals)
Solvents: 56.184% by weight of propylene glycol monomethyl ether acetate and 25.479% by weight of methyl ethyl ketone Example 4

A red ink composition for use in roll printing was prepared in the same manner as in Example 3 except that 4.177% by weight of the polyester resin was used singly as a binder resin without using the acrylic resin.

Example 5

The following components were mixed together with stirring for 5 hours to prepare a heat-curable blue ink composition for use in inkjet printing. The contents of the components are expressed as a percent based on the total weight of the components.
Colorants: 6.02% by weight of a blue pigment (Pig. Blue #15:6) and 1.08% by weight of a violet pigment (Pig. Violet #23)
Binder resin
Polyester resin: 5.74% by weight of a polymer (Mw=12,400, A.V. 99) prepared by addition polymerization of a polycondensation product of ethylene glycol ditrimellitate/2,2-bis(hydroxymethyl)propionic acid (70:100 (mol/mol)) with glycidyl methacrylate and hydroxyethyl methacrylate (140:7 (mol/mol))
Polyfunctional monomer: 11.2% by weight of dipentaerythritol hexaacrylate
Thermal polymerization initiator: 0.5% by weight of an azoamide (V-40, Wako Pure Chemical Industries Ltd.)
Additives: 3.2% by weight of a polyester dispersant, 0.2% by weight of 3-methacryloxypropyltrimethoxysilane as an adhesion promoter, and 0.06% by weight of a surfactant (BYK-330, BYK-Chemie)
Solvents: 67.54% by weight of butyl carbitol acetate and 4.46% by weight of butoxypropanol Example 6

The following components were mixed together with stirring for 5 hours to prepare a heat-curable red ink composition for use in inkjet printing. The contents of the components are expressed as a percent based on the total weight of the components.
Colorants: 4.068% by weight of a red pigment (Pig. Red #254), 2.5425% by weight of a red pigment (Pig. Red #177) and 1.2407% by weight of a yellow pigment (Pig. Yellow #150)
Binder resin
Polyester resin: 4.048% by weight of a polymer (Mw=12,400, A.V. 99) prepared by addition polymerization of a polycondensation product of ethylene glycol ditrimellitate/2,2-bis(hydroxymethyl)propionic acid (70:100 (mol/mol)) with glycidyl methacrylate and hydroxyethyl methacrylate (140:7 (mol/mol))
Polyfunctional monomer: 8.096% by weight of dipentaerythritol hexaacrylate
Thermal polymerization initiator: 0.5% by weight of an azoamide (V-40, Wako Pure Chemical Industries Ltd.)
Additives: 4.2478% by weight of a polyester dispersant, 0.2% by weight of 3-methacryloxypropyltrimethoxysilane as an adhesion promoter, and 0.06% by weight of a surfactant (BYK-330, BYK-Chemie)
Solvent: 74.997% by weight of butyl carbitol acetate Comparative Examples 1-4

Preparation of Heat-Curable Ink Compositions Using Acrylic Resin Having Ethylenically Unsaturated Groups by Free-Radical Polymerization Comparative Example 1

A blue ink composition for use in roll printing was prepared in the same manner as in Examples 1 and 2 except that the acrylic resin having ethylenically unsaturated groups was used singly as a binder resin. Specifically, 6.24% by weight of a polymer (Mw=9,000, A.V. 90) prepared by addition polymerization of a benzyl (meth)acrylate/(meth)acrylic acid (70:30 (mol/mol)) copolymer with allyl glycidyl ether was used as the acrylic resin.

Comparative Example 2

A red ink composition for use in roll printing was prepared in the same manner as in Examples 3 and 4 except that the acrylic resin having ethylenically unsaturated groups was used singly as a binder resin. Specifically, 4.177% by weight of a polymer (Mw=9,000, A.V. 90) prepared by addition polymerization of a benzyl (meth)acrylate/(meth)acrylic acid (70:30 (mol/mol)) copolymer with allyl glycidyl ether was used as the acrylic resin.

Comparative Example 3

A blue ink composition for use in inkjet printing was prepared in the same manner as in Example 5 except that an acrylic resin having ethylenically unsaturated groups was used instead of the binder resin. Specifically, 5.74% by weight of a polymer (Mw=9,000, A.V. 90) prepared by addition polymerization of a benzyl (meth)acrylate/(meth)acrylic acid (70:30 (mol/mol)) copolymer with allyl glycidyl ether was used as the acrylic resin.

Comparative Example 4

A red ink composition for use in inkjet printing was prepared in the same manner as in Example 6 except that an acrylic resin having ethylenically unsaturated groups was used instead of the binder resin. Specifically, 4.048% by weight of a polymer (Mw=9,000, A.V. 90) prepared by addition polymerization of a benzyl (meth)acrylate/(meth)acrylic acid (70:30 (mol/mol)) copolymer with allyl glycidyl ether was used as the acrylic resin.

Experimental Example 1

Evaluation of chemical and heat resistance of heat-curable ink compositions

The heat-curable ink compositions of Examples 1-6 and Comparative Examples 1-4 were tested for chemical resistance and heat resistance in accordance with the following procedures.

First, each of the heat-curable ink compositions was spin-coated on a glass substrate, pre-baked at about 100° C. for 100 seconds, and post-baked at 220° C. for about 30 minutes to form a colored coating film.

The film was cut to a size of 3 cm×3 cm and dipped in N-methylpyrrolidone (NMP) at 45° C. for 60 minutes. The absorbance of the NMP solution in which the pigments were dissolved was measured using a UV-Vis spectrometer to determine the chemical resistance of the ink composition. The red ink compositions and the blue ink compositions were measured for absorbance at 520 nm and at 671 nm, respectively. A lower absorbance of the solution implies that smaller amounts of the pigments were dissolved, which can be considered to be better in terms of chemical resistance.

The colored coating film formed on the glass substrate was left in a vacuum oven at 230° C. for 60 minutes. A difference in the color of the coating film before and after the thermal treatment was used to determine the heat resistance of the composition. A smaller color difference can be considered to be better in terms of heat resistance. The results are shown in Table 1.

TABLE 1

Measurement results for chemical resistance and heat resistance of the heat-curable ink compositions

| Properties | Film thickness (µm) | Chemical resistance | | Heat resistance ($\Delta E_{ab}$) |
|---|---|---|---|---|
| | | Wavelength (nm) | Absorbance | |
| Example 1 | 1.8 | 671 | 0.004 | 1.95 |
| Example 2 | 1.8 | 671 | 0.005 | 1.87 |
| Example 3 | 1.8 | 520 | 0.02 | 0.47 |
| Example 4 | 1.8 | 520 | 0.018 | 0.42 |
| Example 5 | 1.8 | 671 | 0.21 | 2.50 |
| Example 6 | 1.8 | 520 | 0.19 | 0.85 |
| Comparative Example 1 | 1.8 | 671 | 0.037 | 2.37 |
| Comparative Example 2 | 1.8 | 520 | 0.2 | 0.84 |
| Comparative Example 3 | 1.8 | 671 | 0.53 | 3.36 |
| Comparative Example 4 | 1.8 | 520 | 0.55 | 1.24 |

As apparent from the foregoing, the present invention provides a heat-curable ink composition for use in roll printing or inkjet printing which comprises a polyester resin having ethylenically unsaturated groups. The ink composition of the present invention has better resistance to chemicals and heat than an ink composition comprising only an acrylic resin prepared by free-radical polymerization.

In addition, the present invention provides a cured product of the ink composition comprising a polyester resin. For example, the cured product is useful as a red, green, blue or black matrix pattern for a color filter.

The invention claimed is:

1. A heat-curable ink composition comprising a binder resin, a pigment, a polyfunctional monomer, a thermal polymerization initiator and a solvent wherein the binder resin is a polyester resin having the structure of Formula 1:

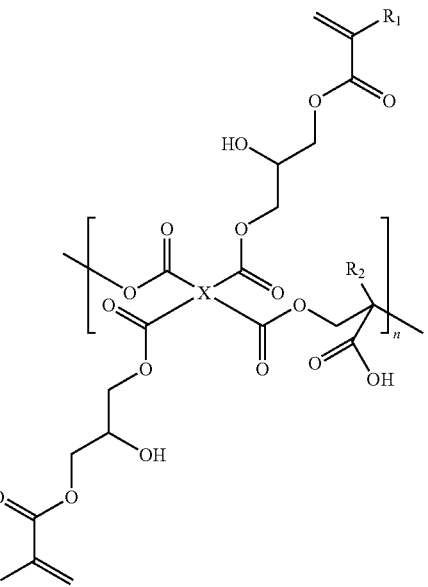

(1)

wherein X is a tetravalent group derived from a polybasic acid anhydride, each $R_1$ is a hydrogen atom or a methyl group, and $R_2$ is selected from methyl and ethyl groups, n wherein n represents the degree of polymerization by weight average molecular weight in the range of 1000 to 200,000.

2. The ink composition according to claim 1, wherein the polyester resin of Formula 1 is derived from a compound prepared by ring-opening polymerization of a) a diol compound having an acid group and b) a polybasic acid anhydride.

3. The ink composition according to claim 2, wherein the diol compound having an acid group a) has the structure of Formula 2:

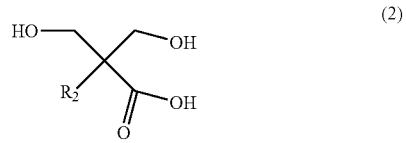

(2)

wherein $R_2$ is selected from methyl and ethyl groups.

4. The ink composition according to claim 2, wherein the polybasic acid anhydride b) is selected from the group consisting of 1,2,4,5-benzenetetracarboxylic dianhydride, 3,3',4,4'-benzophenonetetracarboxylic dianhydride, biphenyltetracarboxylic dianhydride, bis(3,4-dicarboxyphenyl)ether dianhydride, bis(3,4-dicarboxyphenyl)sulfide dianhydride, bis(3,4-dicarboxyphenyl)sulfone dianhydride, 1,4-bis(2,3-dicarboxyphenoxy)benzene dianhydride, 1,3-bis(3,4-dicarboxyphenoxy)benzene dianhydride, 2,3,6,7-naphthalenetetracarboxylic dianhydride, 4,4'-bis(3,4-dicarboxyphenoxy) diphenyl dianhydride, 4,4'-bis(3,4-dicarboxyphenoxy) diphenyl ether dianhydride, 4,4'-bis(3,4-dicarboxyphenoxy) diphenyl sulfone dianhydride, bis(3,4-dicarboxyphenyl) methane dianhydride, 1,1-bis(3,4-dicarboxyphenyl)ethane dianhydride, 1,2-bis(3,4-dicarboxyphenyl)ethane dianhydride, 2,2-bis(3,4-dicarboxyphenyl)propane dianhydride, 2,2-bis[4-(3,4-dicarboxyphenoxy)phenyl]propane dianhydride, 4-(2,3-dicarboxyphenoxy)-4'-(3,4-dicarboxyphenoxy)diphenyl-2,2-propane dianhydride, ethylene glycol ditrimellitate, 2,2-bis(3,4-dicarboxyphenyl)hexafluoropropane dianhydride, 1,3-bis(3,4-dicarboxyphenyl)hexafluoropropane dianhydride, 2,2-bis[4-(3,4-dicarboxyphenoxy)phenyl] hexafluoropropane dianhydride, 4,4'-bis[2-(3,4-dicarboxyphenyl)hexafluoroisopropyl]diphenyl ether, and mixtures thereof.

5. The ink composition according to claim 1, wherein the ink composition comprises 1 to 30% by weight of the polyester resin, 2 to 15% by weight of the pigment, 0.1 to 5% by weight of the thermal polymerization initiator, 1 to 30% by weight of the polyfunctional monomer, and 50 to 90% by weight of the solvent, based on the total weight of the ink composition.

6. The ink composition according to claim 1, wherein the thermal polymerization initiator is selected from the group consisting of azo compounds, azonitrile compounds, azoamide compounds, azoamidine compounds, macroazo compounds, and mixtures thereof.

7. The ink composition according to claim 1, wherein the polyfunctional monomer is selected from the group consisting of polyethylene glycol mono(meth)acrylate, polypropylene glycol mono(meth)acrylate, phenoxyethyl (meth)acrylate, polyethylene glycol (meth)acrylate, polypropylene glycol (meth)acrylate, trimethylolethane triacrylate, trimethylolpropane triacrylate, neopentyl glycol (meth)acrylate, pentaerythritol tetraacrylate, pentaerythritol triacrylate, dipentaerythritol pentaacrylate, dipentaerythritol hexaacrylate, caprolactone-modified polyfunctional monomers, epoxy acrylates of bisphenol A derivatives, novolac-epoxy acrylates, urethane-based polyfunctional monomers, and mixtures thereof.

8. The ink composition according to claim 1, further comprising a surfactant.

9. The ink composition according to claim 8, wherein the surfactant is selected from silicone- and fluorine-based surfactants.

10. The ink composition according to claim 8, wherein the surfactant is present in an amount of 0.03 to 1% by weight, based on the total weight of the ink composition.

11. The ink composition according to claim 1, further comprising an acrylic resin as a binder resin such that the polyester resin of Formula 1 is present in an amount of at least 30% by weight with respect to the total weight of all binder resins.

12. The ink composition according to claim 8, further comprising at least one additive selected from curing accelerators, thermal polymerization inhibitors, plasticizers, adhesion promoters and fillers.

13. The ink composition according to claim 12, wherein the additive is added in an amount of 0.01 to 2% by weight, based on the total weight of the ink composition.

14. A color filter produced using the ink composition according to claim 1.

* * * * *